(12) United States Patent
Fawcett et al.

(10) Patent No.: US 8,581,985 B2
(45) Date of Patent: Nov. 12, 2013

(54) MERCHANDISE SECURITY SYSTEM INCLUDING DISPLAY STAND HAVING VIDEO CAMERA

(75) Inventors: Christopher J. Fawcett, Charlotte, NC (US); Nicholas M. Sedon, Weddington, NC (US)

(73) Assignee: InVue Security Products Inc., Charlotte, NC (US)

( * ) Notice: Subject to any disclaimer, the term of this patent is extended or adjusted under 35 U.S.C. 154(b) by 1018 days.

(21) Appl. No.: 12/612,145

(22) Filed: Nov. 4, 2009

(65) Prior Publication Data

US 2010/0118144 A1    May 13, 2010

Related U.S. Application Data

(60) Provisional application No. 61/112,976, filed on Nov. 10, 2008.

(51) Int. Cl.
*H04N 7/18* (2006.01)
*H04N 21/4367* (2011.01)

(52) U.S. Cl.
USPC ........................... 348/151; 348/143; 348/150

(58) Field of Classification Search
USPC ........................................................ 348/143
See application file for complete search history.

(56) References Cited

U.S. PATENT DOCUMENTS

| 5,990,938 A * | 11/1999 | Bern .............................. 348/152 |
| 7,168,618 B2 * | 1/2007 | Schwartz ....................... 235/383 |
| 7,403,117 B2 * | 7/2008 | Leyden et al. ............. 340/568.2 |
| 7,403,119 B2 | 7/2008 | Leyden |
| 2005/0073418 A1 * | 4/2005 | Kelliher et al. ............ 340/572.1 |
| 2006/0103528 A1 | 5/2006 | Leyden |
| 2006/0146133 A1 * | 7/2006 | Pieper ........................... 348/143 |
| 2006/0238342 A1 | 10/2006 | Leyden et al. |
| 2007/0194918 A1 | 8/2007 | Rabinowitz et al. |
| 2009/0224875 A1 | 9/2009 | Rabinowitz et al. |

* cited by examiner

*Primary Examiner* — Andy Rao
*Assistant Examiner* — Tyler Edwards
(74) *Attorney, Agent, or Firm* — InVue Security Products Inc.

(57) ABSTRACT

A merchandise security system includes a display stand for supporting and displaying an article of merchandise, a video imaging device and an actuator operably coupled to the video imaging device for actuating the video imaging device to collect video data in response to a displacement of the article of merchandise relative to the display stand. In exemplary embodiments, the actuator includes a first activation element disposed on a sensor housing configured for attachment to the article of merchandise and a second activation element disposed on the display stand. The first activation element and the second activation element actuate the video imaging device between the inactive state and the active state to collect the video data when the article of merchandise is displaced relative to the display stand. The video imaging device may be a video camera housed within, positioned adjacent to, or integrated with the display stand.

20 Claims, 3 Drawing Sheets

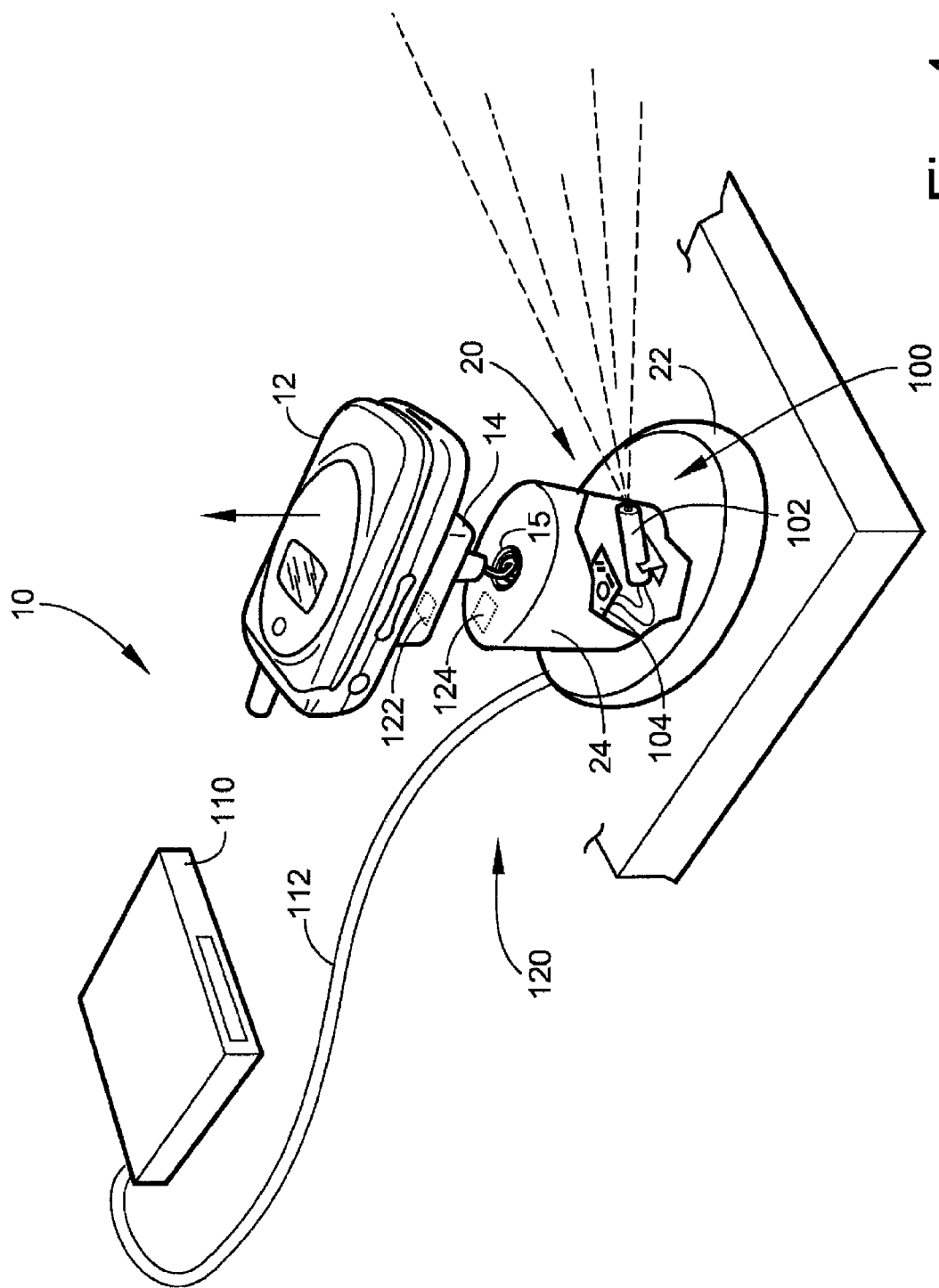

MERCHANDISE SECURITY SYSTEM INCLUDING DISPLAY STAND HAVING VIDEO CAMERA

CROSS REFERENCE TO RELATED APPLICATION

This application claims the benefit of U.S. Provisional Application No. 61/112,976 filed on Nov. 10, 2008, the disclosure of which is hereby incorporated herein in its entirety.

BACKGROUND OF THE INVENTION

The present invention relates generally to merchandise security systems, and more particularly, to a merchandise security system including a display stand for displaying an article of merchandise, while both physically securing the article and collecting video data at a display area.

Conventional merchandise security systems physically restrain an article of merchandise from theft and unauthorized or accidental removal from a retail sales location, such as a merchandise display area. Many merchandise security systems further include an alarm that operates in conjunction with the physical restraint to activate an audible alarm signal and/or a visual (i.e. silent) alarm signal in the event the restraint is removed from the protected article of merchandise, or is otherwise damaged or defeated. Such conventional measures are typically sufficient to prevent theft and accidental losses.

Unfortunately, a calculating thief can at times forcibly remove a physical restraint from a protected article of merchandise and then quickly distance himself and the merchandise from the location of the alarm signal. Due to public safety concerns and in an effort to foster a congenial shopping and working environment, a merchant may prefer to not immediately secure a retail display area or an entire store upon detection of a theft or loss of a single article of merchandise. Some retailers view theft and accidental losses merely as a cost of doing business. Others are unwilling to install audible alarm systems out of concern for the safety and comfort of customers. Others instruct and train their employees to refrain from pursuing and stopping suspected thieves out of concern for the safety of the employee and to avoid liabilities that might occur with honest customers. Such retailers are vulnerable to exploitation by thieves who familiarize themselves with state-of-the-art merchandise security systems and with the security measures, procedures and policies adopted by the retailer.

Accordingly, there exists a need for an improved merchandise security system that remains effective for deterring theft when a retailer elects to not draw attention to the theft within the display area or store, or to pursue the thief at the time of the theft. There exists a further and more specific need for an improved merchandise security system having the capability to collect video data at a merchandise display area. There exists a particular need for a merchandise security system including a display stand for supporting and displaying an article of merchandise that cooperates with a video imaging device (e.g. video camera) for collecting video data at a merchandise display area, for example when the protected article of merchandise is removed from the display stand.

BRIEF SUMMARY OF THE INVENTION

The aforementioned needs, objectives and advantages, as well as others that will be readily apparent to those skilled in the art, are provided by an improved merchandise security system including a display stand for supporting and displaying an article of merchandise. In at least one aspect, the present invention provides a merchandise security system including a display stand that cooperates with a video imaging device and an actuator operably coupled to the video imaging device for actuating the video imaging device to collect video data. In at least one embodiment, the display stand of the merchandise security system houses the video imaging device. In other exemplary embodiments, the actuator includes a first activation element disposed on the display stand and a second activation element disposed on a sensor housing configured for attachment to the article of merchandise. In that example, the actuator is configured to activate the video imaging device when the second activation element is displaced relative to the first activation element. The video imaging device may be a video camera disposed within, positioned adjacent to, or integrated with the display stand.

In another aspect, a merchandise security system according to the invention includes a display stand for supporting and displaying an article of merchandise and a video imaging device for collecting video data in response to a displacement of the article of merchandise from the display stand. The video imaging device has an inactive state and an active state and the video imaging device is actuated to collect video data when the article of merchandise is displaced relative to the display stand.

In yet another aspect, a merchandise security according to the invention includes a display stand, a sensor housing configured for attachment to the article of merchandise, a cable connecting the sensor housing and the display stand, a video imaging device operatively coupled with the display stand and the sensor housing, and an actuator for actuating the video imaging device to obtain video data when the article of merchandise is displaced relative to the display stand.

In yet another aspect, a merchandise security system according to the invention includes a display stand, a video imaging device, and an actuator operatively coupled with the video imaging device for actuating the video imaging device between an inactive state and an active state wherein the video imaging device collects video data when the article of merchandise is displaced relative to the display stand.

BRIEF DESCRIPTION OF THE DRAWINGS

The subject matter that is regarded as the invention may be best understood by reference to the following detailed description taken in conjunction with the accompanying drawing figures.

FIG. 4 is an environmental perspective view of the merchandise security system of FIG. 2, illustrating the video imaging device in wired communication with a remote video recording device as the article of merchandise is being removed from the display stand.

DETAILED DESCRIPTION OF THE INVENTION

Figure 1:
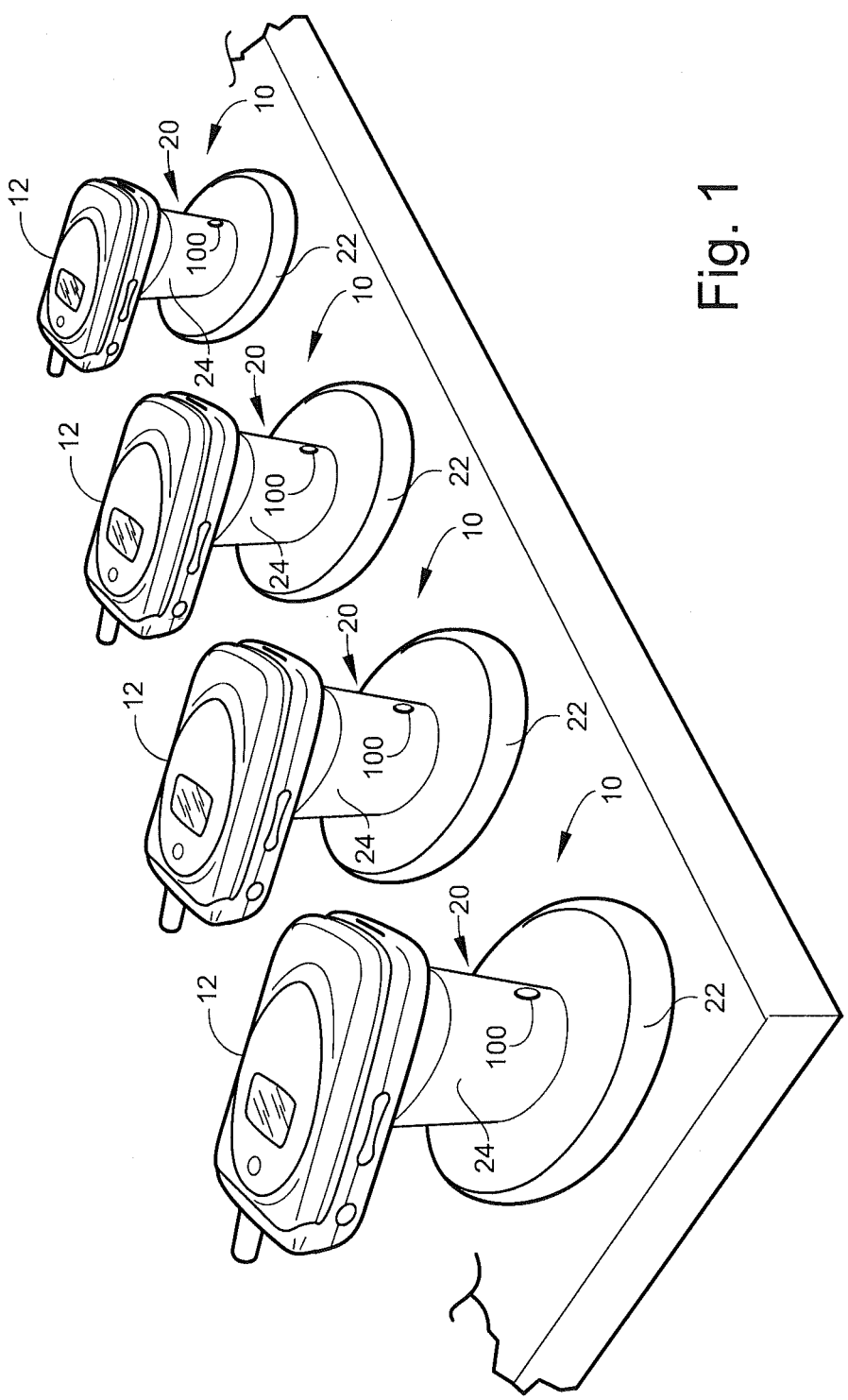
FIG. 1 is an environmental perspective view of a plurality of merchandise security systems according to an exemplary embodiment of the present invention, each including a display stand for supporting and displaying an article of merchandise.

Referring to the drawings, wherein identical reference numerals denote the same elements throughout the various views, a merchandise security system is shown, indicated generally at 10, according to an exemplary embodiment of the present invention. The merchandise security system 10 comprises a display stand 20 operable for supporting and displaying an article of merchandise, for example a relatively small and relatively expensive consumer electronics product, such as a mobile telephone, digital camera, digital music player, Personal Data Assistant (PDA) type device and the like. The article of merchandise is indicated generally at 12 in FIG. 1 wherein a plurality of merchandise security systems 10 are shown protecting respective articles of merchandise 12, as is common in a merchandise display area of a retail sales location.

The merchandise security system 10 shown and described herein is adapted to permit a potential purchaser to closely examine and operate a protected article of merchandise 12, while deterring theft and preventing unauthorized or accidental removal of the article of merchandise from a merchandise display area. The embodiment of the security system 10 shown in FIGS. 3-4 further comprises a sensor housing 14 mechanically affixed to the article of merchandise 12, and a cable 15 that interconnects the sensor housing with the display stand 20, or alternatively with a central power and/or alarm module (not shown) in a known manner. As a result, the article 12 is physically restrained by the tensile strength of the cable 15 from being removed from the display stand 20 more than a predetermined distance. Insofar as the display stand 20 is rigidly attached to a stationary support, such as a table top, counter top, shelf, desk or other relatively fixed support surface indicated generally at S, the cable 15 and the sensor housing 14 act to physically restrain the article of merchandise 12 in the display area within the immediate vicinity of the display stand.

The cable 15 may physically attach the sensor housing 14 and the article of merchandise 12 to the display stand 20, or alternatively to a base module of the security system 10 below the support S, without conveying power or a communications signal (e.g. electrical, optical, etc.) to the sensor housing 14 or the article of merchandise 12. However, the security system 10 may also include a power supply, or be in electrical communication with a power supply, that provides power and/or a communications signal through the cable 15 to electronics housed within the sensor housing 14 and/or to the article of merchandise 12. Furthermore, the security system 10 may include an internal or external alarm (not shown) that produces an audible and/or visual alarm signal when the article of merchandise 12 is separated from the sensor housing 14, or when the power and/or communications signal conveyed by cable 15 is interrupted. A display stand 20 according to the present invention may also be provided with a cable 15 that provides only a physical or mechanical restraint, in which case the article of merchandise 12 may be powered by an internal power source, such as a battery, or may be displayed in an inoperable state. Alternatively, the article of merchandise 12 may be without any powered functionality.

As shown and described herein, the display stand 20 comprises a base 22 and a pedestal 24 extending upwardly from the base. The base 22 and pedestal 24 may be formed in any known manner from any suitable structural material, such as plastic, composite or metal, and is preferably molded from a hard, durable, lightweight plastic. In the embodiments shown in FIGS. 3-4 where a cable 15 is provided, the pedestal 24 may serve as a collection tube having an internal passageway for extracting and collecting the cable, or for permitting passage of the cable 15 through the base 22. In turn, the base 22 may extract and collect the cable 15 or may permit passage of the cable to a gathering device, such as a conventional retractor, retraction mechanism or re-coiler (not shown) disposed beneath the support S.

Figure 2:
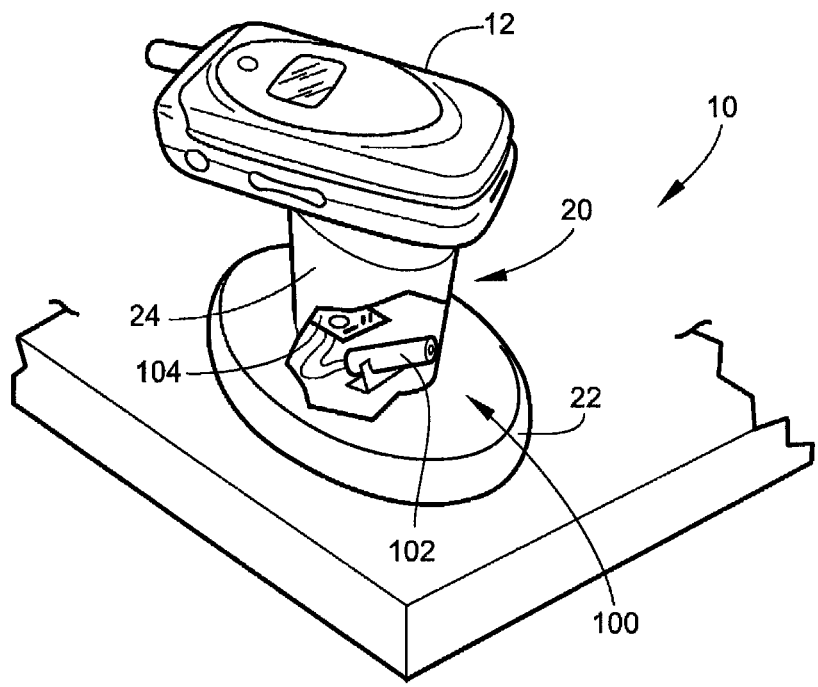
FIG. 2 is an environmental perspective view of a typical one of the merchandise security systems of FIG. 1, shown in partial cutaway to illustrate a video imaging device housed within the display stand.
Figure 3:
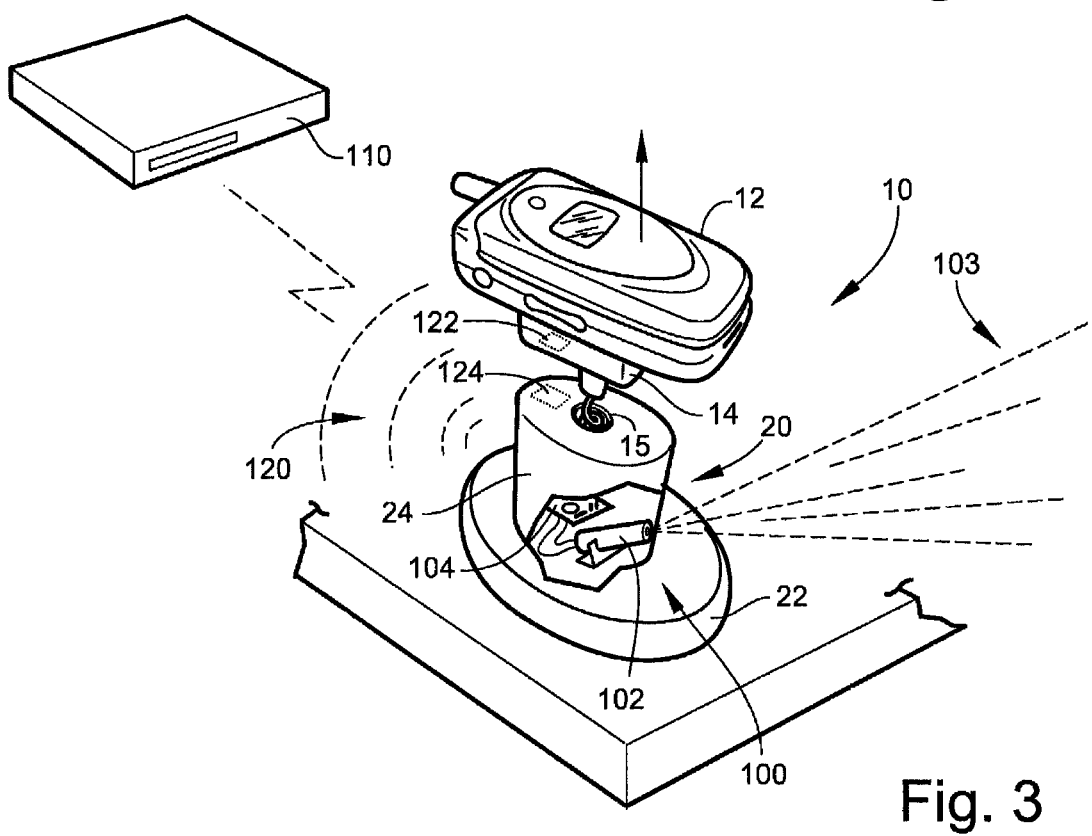
FIG. 3 is an environmental perspective view of the merchandise security system of FIG. 2, illustrating the video imaging device in wireless communication with a remote video recording device as the article of merchandise is being removed from the display stand.

Regarding now particularly inventive aspects of the security system 10, a video imaging device 100 configured to cooperate with the display stand 20 is shown in FIGS. 2-4. The video imaging device 100 is expressly shown herein to comprise a video camera 102 and an associated electronics module 104, although other known types of video imaging devices other than a video camera are intended to be within the scope of the present invention. The article of merchandise 12 is shown affixed to the sensor housing 14, which in turn is positioned on the pedestal 24 in FIG. 2 and is shown removed somewhat from the pedestal in FIGS. 3-4. The position of the article of merchandise 12 shown in FIG. 2 represents an inactive state of the video imaging device 100 between predetermined occurrences such as shown in FIGS. 3-4 wherein the article of merchandise 12 is removed from the pedestal 24, for example while being examined and/or operated by a potential purchaser. In at least one embodiment of the present invention, the video imaging device 100 of the security system 10 enters an active state when the article of merchandise 12 is removed or displaced from the pedestal 24. The active state may be prompted when an actuator 120 detects removal or displacement of the article of merchandise 12 from the pedestal 24 according to a signal generated by one or more activation elements. For example, a first activation element 122 is shown in FIGS. 3-4 as being housed within, disposed on, or attached to the sensor housing 14; and a second activation element 124 is shown as being housed within, disposed on, or attached to the pedestal 24 of the display stand 20.

The activation elements 122 and 124 are described broadly herein as comprising any component or combination of components operable for actuating the video imaging device 100, and more particularly, for altering the operating state of the video imaging device 100 between the inactive state and the active state. Several examples of activation elements 122, 124 suitable for performing the function of altering the state of the video imaging device 100 are provided herein; however, the examples described herein are not exhaustive and any suitable actuator 120 and activation elements are intended to be within the scope of the present invention. Generally stated, the video imaging device 100 of the security system 10 is prompted into an active state upon movement or displacement of the article of merchandise 12 away from the pedestal 24. In each example described below, when the article of merchandise 12 and the sensor housing 14 are displaced relative to the display stand 20, mechanical, electrical, magnetic, radio frequency (RF), infrared (IR), optical or other energy between the activation elements 122, 124 is lost, disturbed, altered or enhanced and the activation elements operate to identify such an occurrence.

In one particular example, the activation element 122 is a contact, proximity or limit switch that toggles between an electrically conducting configuration and an electrically non-conducting configuration as the article of merchandise 12 is positioned onto the pedestal 24 and displaced off of the pedestal, with or without the sensor housing 14. It should be noted that the sensor housing 14 may be present and comprise the activation element 122, or may be eliminated entirely. Alternatively, the sensor housing 14 and the activation element 122 may be integrated with the article of merchandise 12 without departing from the invention. In this instance, the activation element 124 is a contact against which a trigger, plunger, pin or the like of the activation element 122 contacts to activate or deactivate the switch when the article of merchandise 12 is positioned on the display stand 20. Alternatively, the activation elements 122 and 124 may be reversed such that the activation element 124 is a contact, proximity or limit switch and the activation element 122 is a contact that the activation element 124 engages.

In another particular example, the activation elements 122 and 124 comprise opposing components of a magnetic proximity switch that activates or deactivates as the article of merchandise 12 is displaced relative to the pedestal 24 of the display stand 20, with or without the sensor housing 14. It should be noted that the sensor housing 14 may be present and comprise the activation element 122, or may be eliminated entirely. Alternatively, the sensor housing 14 and the activation element 122 may be integrated with the article of merchandise 12 without departing from the invention.

In yet another particular example, the activation element 124 comprises an optical or other photo-sensitive device that receives ambient light when the article of merchandise 12 is displaced relative to the display stand 20, with or without the sensor housing 14, so as to detect removal of the article and responsively actuate the video imaging device 100 of the security system 10 from an inactive state into an active state. It should be noted that the sensor housing 14 may be present, or may be eliminated entirely. Alternatively, the sensor housing 14 may be integrated with the article of merchandise 12 without departing from the invention.

Thus, as will be readily apparent to those skilled in the art, the activation elements 122 and 124 may comprise any suitable means for actuating the video imaging device 100 between an inactive state and an active state upon displacement or removal of the article of merchandise 12 from the display stand 20. Regardless, the function of one or both of the activation elements 122 and 124 is to determine whether the article of merchandise 12 has been displaced from its position on the display stand 20, and if so, to actuate the video imaging device 100 between the inactive state and the active state.

In one or more other exemplary embodiments of the present invention, the actuator 120 comprises a radio-frequency (RF) wireless proximity sensor system that includes a wireless transceiver component and a responsive component. In one such example, the activation element 124 on or at the display stand 20 comprises a transceiver component that detects the loss of a return signal from the activation element 122 (the responsive component) when the article of merchandise 12 and/or the sensor housing 14 are displaced from the display stand 20. Upon loss of the return signal, the video imaging device 100 of the security system 10 is changed from an inactive state to an active state and the video imaging device is actuated. The activation element 122 may be a radio-frequency identification (RFID) tag assigned specifically to the article of merchandise 12 or the sensor housing 14 so that the activation element 124 of actuator 120 can identify the return signal from an assigned tag among cross-talk signals from nearby tags in a merchandise display area where more than one security system 10 is in use simultaneously to display multiple articles of merchandise 12, as shown in FIG. 1. It should be noted that the activation element 122 carried by the article of merchandise 12 and/or the sensor housing 14 may be the transceiver component and the activation element 124 carried by the display stand 20 (or other structure associated with the security system 10) may be the responsive component without departing from the invention.

In other exemplary embodiments, the actuator 120 comprises an infrared (IR) sensor system in which the activation elements 122 and 124, in either order, are configured to send and/or receive IR signals. When, for example, activation element 122 is an IR receiver and fails to detect the infrared emissions of an IR transmitter (the activation element 124), the video imaging device 100 of the security system 10 is changed from an inactive state to an active state and the video imaging device is actuated. It should be noted that the activation element 122 carried by the article of merchandise 12 and/or the sensor housing 14 may be the IR transmitter and the activation element 124 carried by the display stand 20 (or other structure associated with the security system 10) may be the IR receiver without departing from the invention. Furthermore, either activation element 122 or 124 may comprise an IR emitter/detector while the other activation element comprises a reflective area that reflects an IR signal so long as the emitter/detector and the reflective area are aligned and spaced apart within a predetermined range, which conditions will not likely be maintained once the article of merchandise 12 or the sensor housing 14 are displaced sufficiently from the display stand 20. In this emitter/detector and reflector example, the security system 10 is activated and the video imaging device 100 is actuated when detection of the reflection of the IR signal being emitted is lost.

In yet other exemplary embodiments, the actuator 120 comprises a magnetic pulse detection system in which a magnetic pulse is sent and received. In such embodiments, the magnetic pulse can be generated at the article of merchandise 12, at the sensor housing 14, or at the display stand 20. For example, the activation element 124 at the display stand 20 may transmit, emit or send a magnetic pulse and the activation element 122 at the sensor housing 14 may receive or detect the magnetic pulse. Alternatively, the functions of the activation elements 122 and 124 may be reversed, as previously described. In either case, a magnetic pulse can be generated periodically or intermittently, for example, by passing an electrical current through a coil. The magnetic pulse can be detected, for example, by way of an electromotive force (EMF) induced in another coil or by movement of a ferromagnetic element that opens or closes a switch or circuit. In these embodiments, the video imaging device 100 of the security system 10 is actuated when an electrical or optical signal generated by a magnetic pulse suddenly initiates or suddenly dissipates or terminates. Either instance represents a change of status with regard to the location of the article of merchandise 12 or the sensor housing 14 relative to the display stand 20, or a loss of power or function of one or both of the activation elements 122 and 124.

Once the security system 10 is prompted into an active state upon displacement of the article of merchandise 12 from the pedestal 24 of the display stand 20, the video imaging device 100 enters one of several possible video collection modes. For example, the video imaging device 100 may enter a motion video collection mode wherein a video data stream captured by the video camera 102 and generated by the electronics module 104 conveys a series of closely timed images that together define motion video data. In another example, the video imaging device 100 enters a snapshot sequence video collection mode wherein the video data stream conveys a series of time-separated still images. In yet another example, the video imaging device 100 enters a video collection mode wherein time-separated motion video data streams are captured, generated and conveyed. In view of these examples, it should be understood that this description is intended to encompass various modes of capturing, generating and conveying motion video data and still image data.

Whether motion video data, still image data, or a combination thereof is conveyed by the video data stream captured by the digital camera 102 and generated by the electronics module 104, the content of the video data stream may be monitored by sales or security personnel in real-time, and in addition, may be recorded and stored. A remote recording device 110 is shown in wireless communication with video imaging device 100 in FIG. 3. In that example, the video imaging device 100 includes a wireless transmitter that conveys the video data stream and/or any other desired data stream relating to the security system 10 to the recording device 110. Such transmissions may occur as the video data stream is generated, or alternatively, the video data stream may be temporarily stored by the video imaging device 100 and periodically transmitted to the recording device 110. The video imaging device 100 may be operable for receiving control commands from the recording device 110 or another control device so that desired functions and modes of the video imaging device can be prompted, discontinued, repeated, programmed, or otherwise controlled. Transmitting and receiving may also be facilitated by two-way wireless transceiver devices at one or both of the video imaging device 100 and the recording device 110. In FIG. 4, the video imaging device 100 is shown to communicate with the recording device 110 through a conductive cable 112 so that the video data stream, including any other desired data stream, is conveyed to the recording device through the cable. The cable 112 may also convey control commands to the video imaging device 100 in other exemplary embodiments of the invention.

The security system 10 may return to the inactive state in any suitable manner according to the various embodiments of the invention. In one example, once commanded into a video collection mode, the security system 10 is engaged in collecting video data until the article of merchandise 12 and/or the sensor housing 14 are returned to the display stand 20, as determined by the activation elements 122 and 124 previously described. In another example, video collection continues without interruption for a predetermined period of time. In yet another example, video collection continues until a "stop" command is received by the video imaging device 100. For example, a "stop" command may be manually input by an operator, such as sales or security personnel, and transmitted to the video imaging device 100 through the recording device 110 or the cable 112 to terminate video collection.

Several modes for returning to the security system 10 to the inactive state may be combined in certain embodiments of the invention. For example, in at least one embodiment, once placed into a video collection mode the video imaging device 100 remains actuated in the video collection mode: 1) until the article of merchandise 12 and/or the sensor housing 14 are replaced onto the display stand 20; 2) until a predetermined period of time passes; or 3) until an operator "stop" command is received at the video imaging device, whichever occurs first.

In FIG. 3, the video camera 102 is illustrated to observe a field of view 103, which may be maximized by use of a wide angle lens disposed in optical communication with the camera or included as a component in the construction of the camera. The field of view 103 is typically directed generally outward from the display stand 20, as shown in FIG. 3. The video camera 102 and display stand 20 can be oriented such that an image of an individual approaching and/or standing in front of the display stand is captured within the field of view 103. Thus, the video imaging device 100 is positioned to collect motion video data or still image data as an individual approaches and/or stands before the display stand 20. In this instance, the video imaging device 100 may be operating continuously, or alternatively, may be actuated manually by sales or security personnel through the recording device 110 or another remote control device.

Though the video camera 102 is illustrated herein as being disposed within the pedestal 24 of the display stand 20, in various other exemplary embodiments the video camera may be disposed within other portions of the display stand 20 (e.g. base 22), or positioned on, adjacent to or even remote from the display stand. In FIG. 1, the video imaging device identified by reference character 100 is represented by an optical element, such as a lens, or merely an aperture formed through the outer wall of the pedestal 24. In either instance, the optical element or aperture is aligned with the video camera 102 so that video collection by the video camera is possible. In yet another example, the optical element of the video imaging device 100 is an optically transparent or sufficiently translucent filter or shield that protects the video camera 102 from ambient moisture, spilled food and beverages, dust, and handling. The filter or shield may be colored similarly or in contrast with the wall of the pedestal 24 in order to minimize or maximize the visibility of the video camera 102, as desired. Thus, in one embodiment, the presence of the video camera 102 is apparent so as to further discourage theft of the article of merchandise 12, while in other embodiments the video camera 102 is preferably hidden so as to permit clandestine video collection of a thief who unknowingly remains at the merchandise display area while security personnel is being dispatched.

A plurality of security systems 10 may be coupled together in cabled or wireless communication with one another so that all of the security systems 10 are actuated into video collection mode when any one of the articles of merchandise 12 is displaced a predetermined distance from its respective display stand 20. In this manner, the effective field of view of the plurality of security systems 10 is increased over that of a particular video imaging device 100 of a single one of the security systems. In an arrangement such as that shown in FIG. 1, views of a thief from various perspectives may be provided by multiple security systems 10 so that a more detailed physical description of the thief is obtained.

While particular embodiments of the present invention have been described and illustrated, it will be apparent to those skilled in the art that various modifications thereto can be made without departing from the intended spirit and scope of the invention. Accordingly, the foregoing description of exemplary embodiments of the invention and the best mode for practicing the invention are provided for the purpose of illustration only, and not for the purpose of limitation.

That which is claimed is:

1. A merchandise security system comprising:
    a display stand for supporting and displaying an article of merchandise; and
    a video imaging device disposed within the display stand and configured for collecting video data in response to a displacement of the article of merchandise from the display stand.

2. A merchandise security system according to claim 1, wherein the video imaging device is actuated to collect video data when the article of merchandise is displaced relative to the display stand.

3. A merchandise security system according to claim 1, wherein the video imaging device has an inactive state and an active state that is actuated when the article of merchandise is displaced from the display stand.

4. A merchandise security system according to claim 3, further comprising an actuator for actuating the video imaging device between the inactive state and the active state.

5. A merchandise security system according to claim 4, wherein the actuator comprises a first activation element and a second activation element that cooperate to actuate the video imaging device between the inactive state and the active state.

6. A merchandise security system according to claim 5, wherein the first activation element and the second activation element utilize energy selected from the group consisting of mechanical, electrical, magnetic, radio frequency (RF), infrared (IR), and optical energy.

7. A merchandise security system according to claim 5, wherein one of the first activation element and the second activation element comprises a contact switch and the other of the first activation element and the second activation element comprises a contact.

8. A merchandise security system according to claim 5, wherein the first activation element and the second activation element comprise opposing components of a magnetic proximity switch that activates or deactivates as the article of merchandise is displaced relative to the display stand.

9. A merchandise security system according to claim 5, wherein at least one of the first activation element and the second activation element comprises a photo-sensitive device that receives ambient light when the article of merchandise is displaced relative to the display stand.

10. A merchandise security system according to claim 5, wherein one of the first activation element comprises a radio frequency identification (RFID) tag and the other of the first activation element and the second activation element comprises a radio frequency (RF) transceiver that detects the loss or interruption of a return signal from the RFID tag when the article of merchandise is displaced relative to the display stand.

11. A merchandise security system according to claim 5, wherein one of the first activation element comprises an infrared (IR) transmitter/emitter and the other of the first activation element and the second activation element comprises an infrared (IR) receiver/detector that detects the loss or interruption of an infrared emission from the IR transmitter/emitter when the article of merchandise is displaced relative to the display stand.

12. A merchandise security system according to claim 5, wherein one of the first activation element comprises a magnetic pulse transmitter/emitter and the other of the first activation element and the second activation element comprises a magnetic pulse receiver/detector that detects the loss or interruption of a magnetic pulse from the magnetic pulse transmitter/emitter when the article of merchandise is displaced relative to the display stand.

13. The merchandise security system of claim 5, further comprising a sensor housing configured for attachment to the article of merchandise and wherein one of the first activation element and the second activation element are disposed within the sensor housing.

14. A merchandise security system according to claim 3, wherein the video imaging device is operable in a plurality of video collection modes for capturing, generating and conveying at least one of motion video data and still image data.

15. A merchandise security system according to claim 13, further comprising a remote recording device for recording and storing the motion video data and the still image data.

16. A merchandise security system according to claim 3, wherein the video imaging device returns to the inactive state from the active state upon the first to occur of (i) the article of merchandise is returned to the display stand; (ii) the passage of a predetermined period of time; and (iii) a "stop" command is received at the video imaging device.

17. A merchandise security system according to claim 1, wherein the display stand comprises a base and a pedestal extending upwardly from the base, and wherein the video imaging device comprises a video camera that is actuated to capture video data when the article of merchandise is removed from the pedestal of the display stand.

18. A merchandise display system according to claim 17, further comprising a sensor housing configured for attachment to the article of merchandise, and wherein a first activation element is disposed on the sensor housing and a second activation element is disposed on the display stand; the first activation element and the second activation element cooperating to actuate the video imaging device in response to a displacement of the sensor housing and the article of merchandise relative to the display stand.

19. A merchandise security system comprising:
a display stand;
a sensor housing configured for attachment to the article of merchandise;
a cable connecting the sensor housing and the display stand;
a video imaging device disposed within the display stand and operatively coupled with the sensor housing; and
an actuator for actuating the video imaging device to obtain video data when the article of merchandise is displaced relative to the display stand.

20. A merchandise security system comprising:
a display stand;
a video imaging device disposed within the display stand; and
an actuator operatively coupled with the video imaging device for actuating the video imaging device between an inactive state and an active state wherein the video imaging device collects video data when the article of merchandise is displaced relative to the display stand.

* * * * *